United States Patent [19]

Prewitt, Jr. et al.

[11] 4,180,821
[45] Dec. 25, 1979

[54] MOTION TAPE RECORDER

[76] Inventors: Richard H. Prewitt, Jr., P.O. Box 532, Lexington, Ky. 40501; Richard H. Prewitt, 1634 N. Broadway, Lexington, Ky. 40505

[21] Appl. No.: 622,230

[22] Filed: Oct. 14, 1975

[51] Int. Cl.² .............. G01D 9/00; G01D 15/16; G01D 15/24; G03B 1/04
[52] U.S. Cl. .............................. 346/7; 346/124; 346/136; 242/179; 242/198
[58] Field of Search .................... 346/7, 124, 136; 242/179, 198

[56] References Cited

U.S. PATENT DOCUMENTS

| | | | |
|---|---|---|---|
| 3,618,115 | 11/1971 | Parsazad | 346/7 |
| 3,725,948 | 4/1973 | Prewitt et al. | 346/124 X |
| 3,825,934 | 7/1974 | Price et al. | 346/7 |
| 3,906,511 | 9/1975 | Kelemen | 346/7 |

FOREIGN PATENT DOCUMENTS 1167894  4/1964  Fed. Rep. of Germany ........... 242/198

Primary Examiner—George H. Miller, Jr.

[57] ABSTRACT

An instrument attached to a workpiece at two separated locations or between two members to record movement. It is a mechanical strain or motion recorder. It is driven by the strains or movements being recorded. The record of the movements is made on a cassette type tape. The movements on the tape are modified. Likewise, the motion that advances the tape may also be modified. When these movements are magnified it permits using shorter gage lengths for a given magnitude of movement or unit strain. Enlarging the recorded data simplifies digitizing the record. The unit may be advanced either by one stroke or by both strokes of the strain cycle. The invention includes an arrangement of tape spools and a recording back-up disc or plate which gives a low profile. The tape is guided against a fixed reference side but an added scribe or marker is provided for use with equipment which employs an additional base line for digitizing the recorded data. Low profile flex pivots are used in the lever system which magnifies the strain or movement. Thin wheel flex pivots are used to modify the movement which drives the tape. Provision is made for temperature compensating and for reversing the movement of the instrument.

22 Claims, 23 Drawing Figures

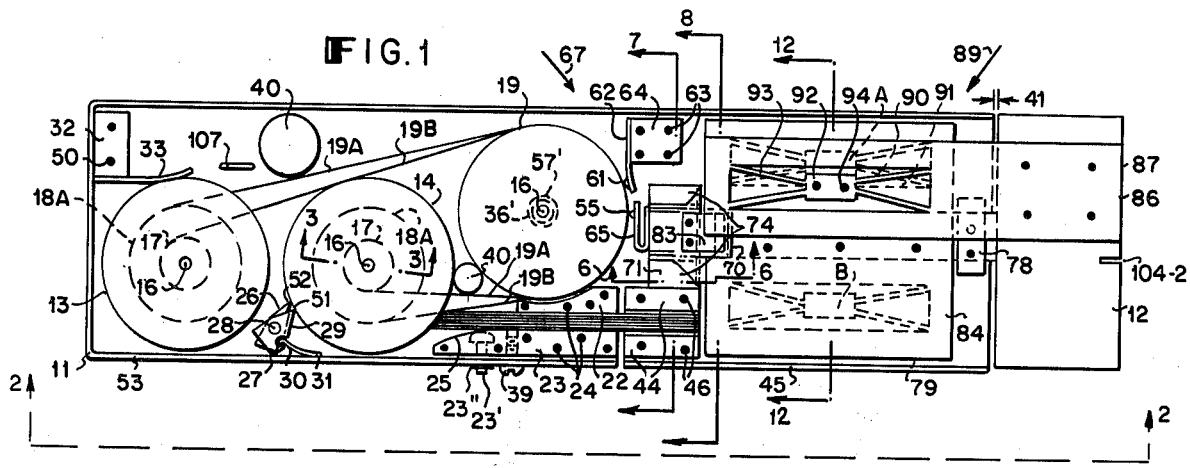
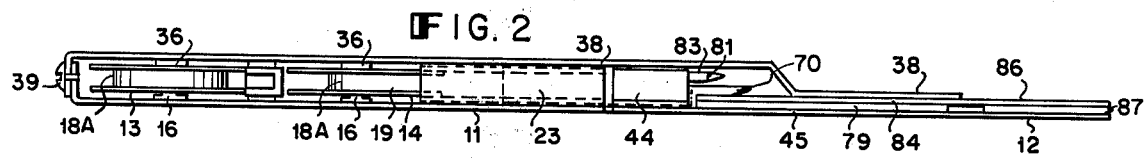
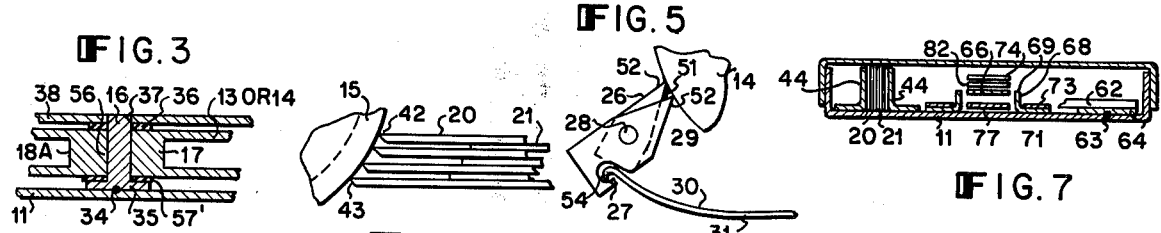
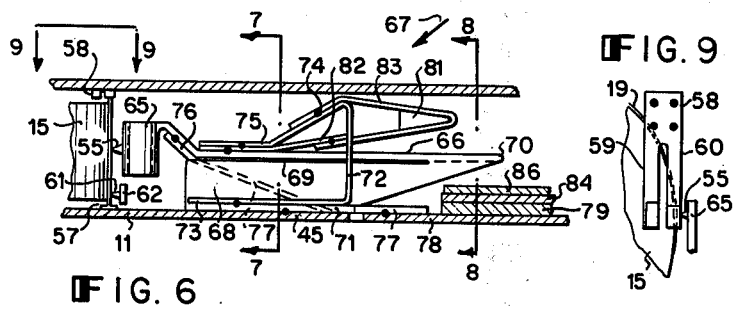
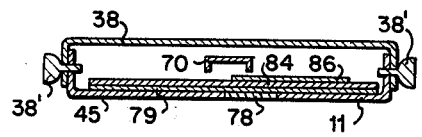
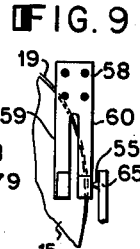
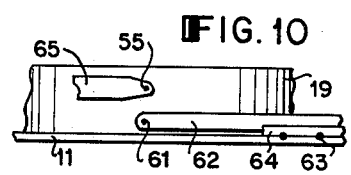
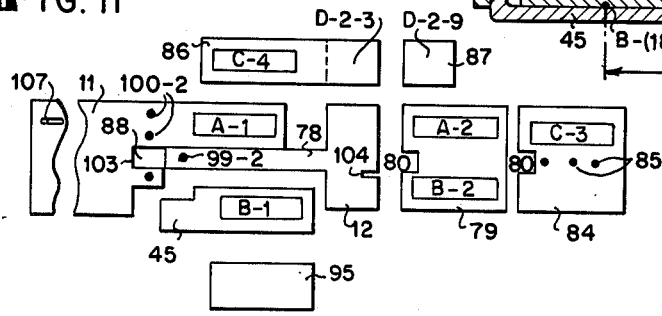

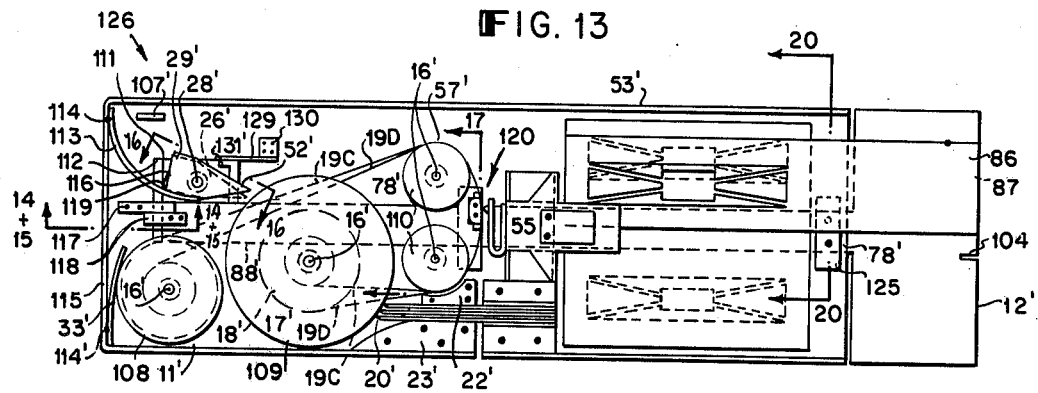

MOTION TAPE RECORDER

REFERENCES

Mechanical Strain Recorders, whose recording media, called target, is advanced by the individual strain cycles being recorded, have been disclosed in U.S. Patents, described below:

U.S. Pat. No. 2,932,967 disclosed a method of advancing an elongated rectangular target. This was the first invention which positively advanced the target proportional to the strain as compared to DeForest U.S. Pat. Nos. 2,081,579 and 2,330,959, which depended upon the release of frictional forces to advance the target. In U.S. Pat. No. 2,932,967 the recorder was attached to the structure in 3 locations. The strain record was obtained from the strain between one end and the center connection and the target was driven from the strain accumulation between the other end connection and the center connection. U.S. Pat. No. 3,430,250 differed from U.S. Pat. No. 2,932,967 in that in U.S. Pat. No. 3,430,250 the target was circular so as to provide for perpetual recording. The same portion of the structure was used to advance the target and record the strains. Target rotational friction was reduced by employing rollers. Wires were used to drive the target. U.S. Pat. No. 3,725,948 covered improved means for inserting the target and for manually advancing the target.

It should be understood that our application for a Motion Recorder Indicator, Ser. No. 622,221, and our application for Recording Instrument Ser. No. 622,229, both filed concurrently with this application cover similar inventions. Any ideas disclosed in either of the co-pending applications and applicable to this application are considered to be a part hereof.

SUMMARY OF INVENTION

Sometimes it is important to store a large quantity of data without recording on top of a previous record. This need may result from either the rapidity of the movements or the length of time that it is desired to record data between changes of the recording media. In order to accomodate these requirements the present invention uses a tape rather than a disc or a flat plate for the recording media. In other respects, its purpose follows the previous inventions mentioned above and disclosed in co-pending applications.

A tape moves over a rotatably mounted disc(s) when being moved from one reel to another reel. The movement of the tape is created by the movements being recorded. The motions are amplified to permit separating individual movements that would otherwise be too small to advance the recording media. This permits recording smaller movements or using shorter gage lengths for recording strains.

A marking point attached to a flex pivot moves in a vertical direction to record the movement on the tape as it passes over a disc or plate. An additional fixed marking point engages the tape near the recording marking point. It may be used for establishing a base line reference. When the fixed marking point is not used the base line reference will be the edge of the tape.

The flex pivot provides a means of changing the direction of action and the ratio between the movements and the marked trace on the recording media. For strains or small movements the trace on the recording media is amplified relative to the movements being recorded.

The marking point and tape may be of any type which will record and permit transcribing the very small movements that may be involved. For example, the tape may be made of a thin metal, preferably of the non-corrosive type, such as, brass, bronze, silver, gold, or stainless steel, and the marking point of a hard material. In this case, the tape would preferably have a polished or coated surface to improve photo-micrographs or for optic-electronic transcribing the recorded data.

There are other possible combinations of the tape and marking point. One is to use magnetic tape and a tiny magnet for the marking point, another is to have the marking point remove a coating from a transparent tape. In this case, the record could be enlarged by projecting the tape on to a screen for observing it or into automatic equipment for electronically transcribing the record.

It is important that the tape be suitable for operating in the environment of intended use. For example, plastics have relatively high dimensional changes with temperature changes. By mechanically amplifying the recorded data the relative effect of the temperature changes is correspondingly reduced. Also, the use of plastics limits the allowable operating temperature. Thus, the selection of optimum combination of tape and marking point depends to a degree upon the application for the instrument environmentally.

The system used for driving the tape reel in this application is similar to a system used for driving a target in a co-pending application. Thin plates engage the rims of a take-up reel to cause it to rotate when movement occurs between the two attachments to the workpiece. Twin stops are provided to prevent reverse rotation when the thin plates retract from the reel.

An exacting temperature compensating means is provided to eliminate trace wandering due to temperature changes. This is accomplished by attaching the temperature compensating plates at the same longitudinal distance from the attachment of the recorder to the workpiece.

In an alternate species the take-up reel is driven by movements in either direction. This system is useful where the transcribing equipment needs a positive slope for each movement in the trace. Also, two tape support discs replace a single disc in the alternate species.

DRAWINGS AND DESCRIPTIONS

Figures

1. Plan view with cover removed.
2. Elevation view with near side removed.
3. Sections view of pivot detail.
4. Plan view of reel driver detail.
5. Plan view of reel stops detail.
6. Elevation view of marking assembly.
7. A cross section view of driver and marking assembly.
8. A cross section view of driving and marking assembly.
9. Plan view of bias springs in cover.
10. Alternate arrangement for reference marker.
11. Plan view of plates.
12. Cross section view of lever plates.
13. Plan view similar to FIG. 1 of another species.
14. Elevation view of tongue retaining plate.
15. Elevation view of tongue retaining plate.

16. Elevation view of stop-drivers.
17. Elevation view marking block.
18. Side elevation view of marking block.
19. Enlarged plan view of biasing springs for stop-drivers.
20. Section view of tongue plate.
21. Plan view of temperature compensating plates.
22. Plan view of reversing temperature compensating plates.
23. Section view of temperature compensation hold down.

The instrument disclosed in this application is described as though most of the parts were made of stainless steel and spot welded together. It is realized that in production, parts may be made of other materials. Such parts would require joining by other means such as molding, adhesive bonding, metal deformation, casting, riveting, etc. Whereever the words "attached", "fixed", "joined" or "spot welds" are used it is meant that the involved members are put together to act as a single part. The joining of members is indicated by "•". Where the word teflon or teflonized is used, it means to infer any suitable low friction material.

DESCRIPTION

Referring to FIGS. 1 and 2, tape 19 is originally wound around reel 13 in a clockwise direction. From reel 13 tape 19 is wound around disc 15 and fastened to the hub 17 of reel 14. The intermediate positions of tape 19 are shown at 19A. After most of the tape is wound onto reel 14 the tape positions between the disc 15 and reels 13 and 14 is shown at 19B. The record is made on tape 19 as it passes marking point 55 which is activated in a vertical direction due to changes in distance between base plates 11 and 12 at gap 41. This is accomplished by flex pivot assembly 67 which amplifies the movement and changes the direction of marking point 55. Details of flex pivot 67 will be described later.

A lever system is used to amplify the movement which advances the tape for individual strain or motion cycles.

A wheel flex type pivot is used in the lever system for advancing the tape. A wheel flex pivot consists of a hub and thin spoke members which rigidly hold the center location but permit angular deflection between the wheel pivot member and a member to which the hub is attached. When two wheel pivots are joined at their hubs the allowable angular deflection is increased. An important advantage of the wheel pivots disclosed herein is their thinness. They are so thin that they can be stacked. This permits placing cooperating pivots very close together. Also, the wheel pivot has no play.

Referring to FIG. 1, a wheel pivot 89 is made by removing material at apertures 90 and 91 from driver plate 86. This process forms hub 92 and spokes 93. The hubs are joined together at 94. All wheel pivots disclosed herein are of the same form and dimensions as described above. They are indicated as rectangles in FIG. 11.

FIG. 11 shows a plan view of the assembly of base plates, levers, and spacers. The numerals in the flex pivots show the order of arranging the plates, and the letters refer to mating wheel flex pivots. The higher numbers indicate that the member lies above a lower number. Plates 11, 12 and 45 are all located at base level. Lever plate 79 is attached to plate 11 at flex pivot "A" and to plate 45 at "B". Auxiliary lever plate 84 is attached to lever plate 79 at 85. Driver plate 86 is attached to auxiliary lever plate 84 at "C". Driver plate 86 is also attached to base plate 12 through spacer plate 87. The location of these plates in the assemblies is shown in FIGS. 1, 11, and 12.

It may be noted that tongue 78 of small base plate 12 slides in aperture 88 of large base plate 11.

FIG. 12 is section 12—12 of FIG. 1. It shows the flat levers, pivots and attachments that are indicated by solid "•". Spacer 95 is attached to cover 38 at 96. Spacer 95 and cover 38 contact the assembly of levers illustrated in FIG. 12 to support them from out-of-plane bending which could occur due to lack of stiffness of the levers which are made of thin material.

The driving system which rotates reel 14 when changes in distance between base plates 11 and 12 occur includes the lever systems comprising flat plates and pivots described above. One end of dual lever plates 79–84 is attached to base plate 45 at flex pivot "B". The assembly of flat springs 20 that drive reel 14 are also attached to base plate 45 at 46.

The dual plate arrangement of lever plates 79–84 permits placing adjacent pivots very close together because they are on top of each other. The ratio of the drive system may readily be altered by changing the location of flex pivot "C-1" in lever plate 84 relative to flex pivots "A-2" and "B-2" of lever plate 79. This alteration also requires that driver plate 86 and spacer 87 be moved opposite the new location for flex pivot "C-3". The amplification of the driver system illustrated is the ratio of the distance between flex pivots "A" and "B" shown at 108, FIG. 12, to the distance between flex pivots "A" and "C" shown at 109 in FIG. 12. The ratio illustrated is approximately 6:1.

In the species shown in FIG. 1, reel 14 is driven when base plates 11 and 12 are moved closer together. When the base plates 11 and 12 are separated stops 26 and 29 prevent reel 14 from turning counter clockwise caused by the drag of driver springs 20 on reel 14.

Enlarged views of the reel pivot assembly; the contact of the driver springs with the reel; and the reverse stops for the take-up reel are illustrated in FIGS. 3, 4, and 5.

FIG. 3 shows pin 16 with flat head 35 to provide a stable attachment 34 of pin 16 to plate 11. Reels 13 and 14 are interchangeable. Washer 36 mates hole 37 and is attached to cover plate 38. With this arrangement, the reels and associated tape can be reversed or exchanged when cover 38 is removed. The tops of pins 16 are champhored to assist in placing cover 38 over pins 16.

Cover 38 is held in place with screws 39 illustrated at the end of FIG. 2. Two similar screws indicated in FIG. 1 are located on each side of the recorder. Cover support blocks 40 are attached to base plate 11 at suitable locations to support cover 38. Blocks 40 extend from the base plate 11 to cover plate 38. Alternately cover 38 may be attached with screws which pass through cover 38 and thread into blocks 40 and 23. Cover 38 protects the instrument from dust and abuse.

FIG. 4 shows an enlarged view of driver springs 20 with spacers 21 as springs 20 contact rim of reel 15. Flat springs 20 extend between the upper surface of base plate 11 and the lower surface of cover plate 38 with operating clearance. Thus, the width of driver springs 20 and spacers 21 is greater than the width of reel 14 but less than the distance between base plate 11 and cover 38. When driver springs 20 move parallel to the longitudinal axis of the recorder they deflect in order to accomodate the movement at the rim of reel 14. Because the slope at the periphery of reel 14 is constantly changing individual driver springs must be allowed to move relative to each other so that each remains in contact with the rim of reel 14 during operation. This is accomplished by prebending the springs 20 toward the reel 14 and by separating the springs from each other with separators 21. In this manner, each individual springs 20 creates a force to rotate reel 14 when springs 20 are moving toward reel 14. When springs 20 are moving away from reel 14 the edges 42 slide backward along the flange surfaces of reel 14. Each spring is angled at 43 in order to produce edges 42.

The assembly of driver springs 20 and spacers 21 are fastened together and to angles 44 at the end opposite their contact with reel 14. The two mating angles 44 are attached to auxiliary base plate 45 at 46. The assembly of driver springs 20 and spacers 21 are guided to reel 14 between blocks 22 and 23. Block 23 carries radius 25 which limits the radius of curvature of driver springs 20 so that they will not take a permanent set when the gap 41 between base plates 11 and 12 is closed. The fact that springs 20 are initially bent in the opposite direction is taken into account in establishing the radius of curvature at 25.

FIG. 5 shows an enlarged detail of reverse rotation stops 26 and 29. Stop 29 is made in the form of a "U" and stop 26 is made in the form of a "T". The shank of stop 26 fits in between the U channel of stop 29. Both contact edges 52 extend the full thickness of reel 14. Both stops are balanced about pivot 28 to eliminate torque force about pin 28 when in an accelerating environment. The support for pivot 28 is the same as that illustrated in FIG. 3 for reels 13 or 14. Spring 30 attached to the side 53 of base plate 11 at 31 has an angled end at 54 which engages the slope of aperture 27. The force of spring 30 on stop 29 is in a direction to force edge 52 into engagement with reel 14. Also, the force of spring 30 on aperture 27 pushes stop 29 against pin 28 to remove play between stop 29 and pin 28. Spring material 51 is inserted between members 26 and 29 near edges 52. This material (which may be different for different applications due to temperature requirements) causes stop 26 to tend to move in slave fashion with controlled stop 29.

Disc 15 is mounted on pin 16 in a manner as illustrated in FIG. 3. It is important that tape 19 moves around disc 15 at a constant height above base plate 11 so that errors will not occur due to vertical movement of the tape relative to base plate 11. When a base line is marked on the tape concurrently while recording data, the importance of maintaining an exact height of the tape above the base plate is reduced. The invention contemplates means for maintaining the height of the tape a constant distance above the base plate 11 in the area where marking point 55 contacts tape 19. This is accomplished by preventing disc 15 from moving vertically by making it very light and by biasing its hub down against base plate 11 with intervening low friction material 57' under and above hub 56. The pin 16 and hub 56 will be of small diameter commensurate with the applied loads so as to reduce torsional friction. Washer 36 of FIG. 3 will be of spring material 36'. Hub 17 will be reduced in width to provide adequate space for springs 36'. In addition teflon type material 57, FIG. 6, will be attached to base plate 11 directly under marking point 55. The side of disc 15 and edge of tape 19 will slide along the teflon type material 57 when the tape is advanced. In this case, tape 19 will extend beyond the edge of disc 15 both upper and lower. A dual spring 58 having branches 59 and 60 is attached to cover 38, FIG. 9. Both branches of spring 58 are coated with a teflon type material to reduce friction. Branch 59 contacts the upper side of disc 15 and branch 60 contacts the upper edge of tape 19. In another species the disc 15 clears the teflon material 57. In this case, branch 59 is omitted and only the tape is held vertically.

The alternate approach eliminates the rubbing surface 57. A base line is recorded on the tape concurrently while recording data. In this case, vertical movement of the tape relative to the base plate will cause the same movement in the base line. When the base line is used, optical-electronic equipment reads the changes in distance between the base line and the recorded data. For those that have equipment for digitizing the data in this manner, the invention contemplates the use of an additional marking point 61 attached to spring 62 which is a part of fitting 64 and is attached to base plate 11 at 63. For purposes of illustration point 61 is offset along the length of tape 19; however, with simple modifications illustrated in FIG. 10, marking point 61 can be moved so that it lies directly underneath marking point 55. Its exact location will depend upon the equipment used to transfer the data from the tape to the computer. When the base line is marked on the tape 19 it will not be necessary to precisely control the position of tape 19 relative to base plate 11; therefore, the springs 58 and 36' will not be necessary. In either case, the invention contemplates keeping the tape at a substantially constant distance from the base plate 11. This may be accomplished by retaining low drag member 57 and having the side of disc 15 which is nearest to base plate 11 of very slightly greater diameter than its other side. This causes tape 19 to move toward base plate 11.

Marking point 55 is mounted on spring 65 which is a part of a horizontally oriented strap member 66 of a flex pivot assembly 67, illustrated in FIGS. 1,6,7, and 8. The sides 68 are formed from flat stock which includes strap 66. A slit 69 separates strap 66 and side plates 68 except at end portion 70 where the original plate forms an inverted channel as illustrated in FIG. 8. Side plates 68 are formed away from center at a 90° bend to provide mounting 71 for strap 66 to base plate 11. This structure anchors the outer end of strap 66 to base plate 11 so that the distance between marking point 55 and tape 19 will only vary by the arc of movement of point 55 about the center of flex pivot assembly 67. Spring 65 adequately provides for the small distance changes due to the vertical movement of point 55.

Flex pivot 67 is supported vertically at the marking point 55 by vertically oriented straps 72 located on each side of horizontal strap 66 and by control member 77. The lower end of each strap 72 is bent 90° to form mounting 73 which are attached to the upper side of mountings 71. The upper ends of straps 72 join into a broad tapered member 74 which is bent over approximately 120° and has a straight portion 75 which is attached to the upper side of tongue 82 which is attached to the upper face of strap 66. The end of strap 66 is bent up approximately 45°. Strap 66 is then bent down approximately 135° to form the spring member 65 for holding marking point 55. Another formed member 77 is attached to strap 66 at face 76. Member 77 fits between side members 68 and its lower end is fixed to tongue 78 of small base plate 12 at a position near the vertically disposed straps 72. A cut out is made in lever plate 79 and 84 at 80, FIG. 11, to give ample room for connecting control member 77 to tongue 78. When tongue 78 of small base plate 12 moves longitudinally relative to base plate 11, control member 77 activates flex pivot 67 causing marking point 55 to move vertically (FIGS. 1,6, and 10), about the center of flex pivot 67. Control member 77 also flexes when strap members 66 and 72 flex.

The change in movement between point 55 and base plate 11 and movement between base plates 11 and 12 is approximately the ratio of the distance between marking point 55 and the crossing of flex pivot straps 66 and 72 to the distance from the same crossing to the center of control member 77 at a location directly below the crossing of the flex pivot members 66 and 72. As illustrated, the ratio is approximately 3:1. Other ratios may be provided by altering dimensions. A balance weight 81 is attached to the moving parts of flex pivot 67 to dynamically balance the assembly. This is done to prevent an accelerating environment from affecting the recorded data. The final selection of size location and support for the balance weight(s) will be determined by detail balance calculations and by vibration tests.

The tongue 82 which was made when straps 72 were formed is bent toward marking point 55 and is attached to the upper face of strap 66 at 75. The upper end of plate 83 is attached to broad member 74. Plate 83 extends in a direction away from marking point 55 where it is supports balance weight 81. Plate 83 is bent back toward marking point 55 and is attached to the under side of tongue 82 to give a rigid support to weight 81.

FIGS. 13 through 20 illustrates a species in which reel 14 of FIG. 1 is made to turn for movements in either direction between base plate 11 and 12. This species also shows a different arrangement for the back-up for marking point 55.

The systems for changing movement ratios between base plates 11 and 12 and marking point 55 and the systems that moves driving springs 20 is the same as previously illustrated and described except for dimension changes. Where parts are given the same name and function as previously described but slightly different, they are identified by the addition of a prime (') to the old number.

FIG. 13 shows a plan view of a species with the cover removed. The cover, tape, levers and other parts not mentioned here will use parts that have been previously described. Identical assemblies are not numbered in FIG. 13, except when called out in the description.

Tongue 78 of small base plate 12 is extended in a long aperture 88' in base plate 11. Aperture 112 of base plate 11 accomodates an extension 111 of tongue 78'. Extension 111 provides a platform for mounting the stop-driver assembly 126. Stop-driver assembly 126 is very similar to stop assembly illustrated and described for FIG. 5. Here assembly 126 moves longitudinally relative reel 109 whenever there is longitudinal motion between base plates 11 and 12. This causes assembly 126 to turn reel 109 when base plates 11 and 12 are separated.

The other feature of this species involves the back-up for the tape at the marking point. Disc 15 is replaced by two small separated discs 110 and a back-up stand 120 is placed between discs 110 to support the tape in a constant vertical position relative to base plate 11. Back-up stand 120 is located toward small base plate 12 a sufficient distance to permit tape 19' to form a natural arc between the two discs 110. The tape is held at an approximate true vertical distance from base plate 11 as it passes over each of the discs 110. The only variance allowed when the tape passes over discs 110 is that which is necessary to accomodate width tolerance of the tape and the width tolerance of the aperture which is provided for the tape travel.

Marking block 120 carries a dual spring which bears against the upper edge of the tape to hold it in contact with a lower support which is fixed to base plate 11. In this manner, the lower edge of tape 19' is constantly held in contact with its lower support. A similar support is used for the tape 19' when the information marked on the tape is being digitized or electronically taped. There is no need for the added marking point 61 illustrated in FIG. 1 and 10 for the system illustrated in FIGS. 13, 17, and 18 though it may be added to accomodate digitizing equipment.

The following is a detail description of FIGS. 13 to 20 inclusive. Plates 117 and 118 illustrated in FIGS. 13,14, and 15 hold the end of tongue 78' at the same lever as base plate 11. Member 117 is spot welded to base plate 11 illustrated in FIG. 14. This prevents tongue 78' from moving up. Plate 118, FIG. 15, is spot welded to tongue 78'. Since plate 118 extends over base plate 11, tongue 78' cannot move down relative to base plate 11. A similar arrangement is illustrated in FIGS. 13 and 20 which shows plate 125 spot welded to the upper face of tongue 78' near small base plate 12. Here tongue 78' is prevented from moving down by the overhang of plate 125 over base plate 11. Base plate 12 is prevented from moving up due to spacer 87 and driver plate 86. Flat spring 33 is fastened to end piece 115 and it drags on the flanges of reel 108 to keep slack out of tape 19'.

Stop-driver assembly 126 is shown in FIGS. 13 and 16. The arrangement of "U" member 29' and "T" members 28' is very similar to that illustrated in FIGS. 1 and 5. The primary difference lies in the biasing means for maintaining edge 52' in contact with the associated reel and in the biasing means for removing play in the system. The biasing system is illustrated in FIGS. 13,16, and 19. Spring 113 is attached to the side of "U" member 29' at one end and to end piece 115 at the other end. Biasing of stop-driver 29' is attained by making spring 113 so that it falls short of mating its final location illustrated in FIG. 13. The shortfall is illustrated in FIG. 19 where it may be noted that when spring 113 is deflected so that its end fits against end piece 115 in the location noted in FIG. 13, a force is placed on stop-driver member 29' in a direction to remove effective play between pin 28' and stop-driver member 29'. Also, the process of attaching spring 113 causes edge 52 to contact the flanges of reel 109. Flat spring 116 is attached to the side of stop-driver 26' at one end and it bears against prick punch rise 119 in spring 113 at its other end. The force acting on spring 116 is indicated by directional force arrow 128. The direction of force 128 is such as to cause contact edge 52' to contact reel 109 and to remove effective play between pin 28' and stop-driven 26'. The effects of force 128 on spring 113 along with the other external forces involved will be considered when establishing the deflection of spring 113 when attaching it to end piece 115.

Tongue 78' is biased to one side of aperture 88' of base plate 11 to eliminate lateral movement of tongue 78' at and near tongue extension 111. This is accomplished to prevent stop-driver assembly 126 from moving laterally causing it to function improperly, with slack, when base plates 11 and 12 move longitudinally relative to each other. Post 131 extends up from tongue extension 111 and is fixed thereto. Spring 129 is bent 90° from fixture 130 (of which it is a part) which is fixed to base plate 11. The force of spring 129 against post 131 is sufficient to prevent lateral play between tongue extension 111 and aperture 88' in base plate 11.

The tape is initally on reel 108. It is threaded through reel 109 over first disc 110, through marking block 120, over second disc 110, and on to the hub 17' of reel 109. Initially tape 19' takes the positions indicated at 19C. When nearly all of the tape 19' has been wound on to reel 109, tape 19' takes the positions indicated at 19D.

FIG. 17 shows an elevation view 17—17 of the tape 19', discs 110, and marking block assembly 120 of FIG. 13. As tape 19' passes around discs 110 it is retained between small low friction pads 57' to keep the vertical location of tape 19' approximately constant. Lower patches of the low friction material 57' are attached to base plate 11' and the upper patches of low friction material 57' are attached to the underside of cover plate 38'.

Referring to FIGS. 13, 17, and 18, marking block assembly 120 carries a bridge 132 which spans aperture 88' of base plate 11' to which it is attached at each side of tongue 78'.

The tape 19' passes against a formed block 120 through a teflonized lower slot formed between block 120 and lip 121. A spring biased upper teflonized 123 slot formed between block 120 and springs 124 supports and locates the upper edge of tape 19. The spring 124 creates a downward force to keep the tape 19' bearing against the bottom of teflonized lower slot.

Other than the force of springs 124 forcing tape 19' against the bottom of the lower slot minimum resistance of the movement of tape past block 120 is provided. The face of block 120 that contacts tape 19' is also teflonized to reduce resistance when the tape moves between the face of block 120 and the marking point 55.

Referring to FIG. 1, tape 19 may be manually advanced by forcing pin 23" in until retainer ring 23" is against the side of cover 38. The bulbous end of pin 23' causes drivers 20 to deflect.

When the drivers straighten due to their internal spring energy after release of pin 23, they rotate reel 14 and thereby mark the tape. We contemplate a similar arrangement for the species illustrated in FIG. 13.

Referring to FIG. 8, pin 38' holds cover plate 38 in a neutral position relative to base plates 11 and 45 until after the recorder has been mounted. Prior to activating the recorder pin 38' is removed.

Temperature compensation is important to prevent trace wandering from thermal changes. To provide for true temperature compensation when desired, this application plans to attach temperature compensation plates 87 and 98, FIGS. 21 and 22 underneath the base plates 11, 12, and 15 (noted hereafter as -2 because they lie on top of compensating plates marked -1). The added temperature compensating plates are outlined with broader lines than the outline for the recorder base plates in FIGS. 21 and 22. Plates 97 and 98 illustrated in FIG. 21 and plates 97' and 98' illustrated in FIG. 22 are attached to tongue 78-2 and base plate 11-2 at 99 and 100 in FIG. 21 and at 99' and 100' in FIG. 22. Plates 87, 98, 97', and 98' have the same coefficient of thermal expansion as that of the workpiece to which the recorder is attached. The attachment points 99 and 100 of FIG. 21 are in alignment and attachment points 99' and 100' of FIG. 22 are in alignment. When the workpiece and attached compensating plates change temperature they both expand or contract the same distance; therefore, attachments 99 and 100 and 99' and 100' each remain aligned. This means that changes in temperature do not cause any movement of marking point 55 relative to tape 19'. Should attachments 99 and 100 or 99' and 100' not fall in alignment the marking point will move when temperature changes occur and the recorded strain or movement data will contain errors due to temperature changes.

The recording strains or movement between base plates 11 and 12 is normally only a few thousandths of an inch with a top limit of around ±0.025 inches. This small operating variance of the alignment of attachments 99 and 100 and 99' and 100' is not important compared to previously employed means of temperature compensating mechanical strain recorders. They had an uncompensated length of 0.25 inches or more.

Before using side by side base plates for temperature compensation it was necessary to make the attachment between two butting plates with adequate edge distance on each plate. This caused a separation of 0.25 inches. The new side by side temperature compensation disclosed herein reduces the error in former temperature compensation by a factor of 0.0025/0.25=0.01 for normal application and by a factor of 0.1 for applications where the recorder is used close to its upper limits of movement.

Referring to FIGS. 21 and 23, temperature compensating plate 97-1 carries a tongue 101-1 and plate 98-1 carries a slot 102. Tongue 101 fits in slot 102 leaving a normal gap of 1/32" to 1/'6" at 103-1. In a like manner, tongue 78-2 of small base plate 12-2 fits into aperture 88-2 allowing approximately the same gap between the end of tongue 78-2 and bottom of aperture 88-2 as that shown at 41 of FIG. 1. The gap allowance between base plate 45 and base plates 11-2 and 12-3 will be increased in portion to the ratio of 108/109, FIG. 12.

Plate 98-1 is attached underneath plate 11-2 as indicated at 100-1 and tongue 101-1 is attached underneath tongue 78-2 at 99.

Because there is considerable distance between the attachments 99 and 100 and the ends of the recorder additional sliding attachments are provided between plates 98-1 and 11-2 and between plates 97-1 and 12-2.

Slot 104-2 in base plate 12-2 permits longitudinal movement between compensating base plate 97-1 and base plates 12-2, and 45-2 to accomodate temperature expansion movements. Tongue 105-1 of FIG. 23 fits in slot 104-2. Cap 106 prevents plates 12-2 from moving away from compensating plate 97-1. In a similar manner compensating plate 98-1 has a tongue and cap similar to 105 and 106. A slot 107-2 in base plate 11-2 mates the tongue 105-1 in compensating plate 98-1 and cap 106 to permit sliding fixity between plates 11-2 and 98-1.

FIG. 22 is identical to FIG. 21 except that the aperture and tongue are reversed for the temperature compensating base plates 97-1' and 98-1'. The construction shown in FIG. 22 is probably preferable as it provides better support for floating base plate 45-2. The direction of movement is reversed for the species shown in FIG. 22. For certain installations the reversed motion can be important.

Suppose a compressive movement occurs which causes temperature compensating plates 97' and 98' of FIG. 22 to come closer together. In this case spot weld 99'-2 which attaches tongue 101-1 of temperature compensating plate 98-1 to tongue 78' of small base plate 12-2 causes small base plate 12-2 to move away from large base plate 11-2. Here the recorder base plates 11-2 and 12-2 separate when temperature compensating base plates 97-1 and 98-1 come closer together. In a like manner, recorder base plates 11-2 and 12-2 move closer together when temperature compensating base plates 97-1 and 98-1 separate.

We claim:

1. A mechanical tape recording instrument having a first and second support means; a tape; a first and second tape support reel mounted for moving said tape perpendicular to the plane of said first and second support means; a tape guide mounted on said first support means; a marking point engaging said tape and mounted to move in a substantial transverse plane relative to the movement between said first and second support means, and flat spring member means activated by movement between said first and second support means for rotating said second tape support reel.

2. According to claim 1, including
An additional marking point to mark said tape at a constant distance from said first support means.

3. According to claim 1, in which
said tape support means consisting of a first and second reel, said first reel having an engaged sliding brake to keep slack from forming in said tape.

4. According to claim 1,
said spring members separated by spacers.

5. According to claim 1,
said spring members provided with an apex edge to contact said reel.

6. According to claim 1,
a backing support for said spring member means to limit the strains in said spring members when deflected.

7. According to claim 1
said first support means includes a first slot and said second support means includes a first tongue; said first tongue fits in said first slot; said third support means includes a second tongue; said fourth support means includes a second slot; said second tongue fits into said second slots; said first support means is attached to said fourth support means; and said second support means is attached to said third support means beside the attachment of said first and fourth support means.

8. According to claim 1
a manually activated member for deflecting said flat spring member means whereupon said flat spring members straighten and advance said second tape support reel when said manual activation is nullified.

9. According to claim 1,
and pivoted stop means to prevent said second reel from rotating in an anti-clockwise direction when said flat spring members are retracted.

10. According to claim 9,
said pivoted member(s) is biased to maintain an engaging force between said reel and said pivoted member.

11. According to claim 9,
said pivoted member is biased to remove effective play between said pivoted member and its pivot support.

12. An instrument to record changes in distance between a first and second support means; a tape oriented perpendicular to said first and second support means; said tape mounted on two support members erected from said first support means; a first pivoted means marking said tape to record changes in distance; flat member means connected to a second pivoted means and engaging one of said tape supports; said second pivoted means comprising a flex pivoted lever means for changing the movement of said flat member means relative to the movement between said first and second support means.

13. According to claim 12,
said lever is pivoted to said first support means at one point; to said second support means at a second point; and to an auxiliary base plate carrying said flat member means
at a third point.

14. According to claim 12,
said first support means carrying a reel; said reel advanced by a first and a second means; said first reel advancing means is associated with said lever motion system and said second means of advancing said reel is associated with said second support means.

15. According to claim 12,
said movement between said first and second support means consists of a first and second stroke of a cycle; a first and second means for advancing said tape;
said first means of advancing said tape activated by said first stroke of said cycle and said second means of advancing said tape activated by said second stroke of said movement between said first and second support means.

16. According to claim 15,
said means for advancing said tape is activated to a greater extent by said first means than by said second means.

17. An instrument to record changes in distance between a first and second support means; a tape; said tape mounted on axis support member means erected perpendicular from said first support means; means for advancing said tape; pivoted marking means mounted on said first support means operated by movement between said first and second support means; said marking means moving in a transverse plane relative to said changes in distance between said first and second support means.

18. According to claim 17, in which
said marking point may move a different distance than said movement between said first and second support means.

19. According to claim 17
said first support means includes a first slot; said second support means includes a first tongue; said first tongue fits in said first slot; said third support means includes a second slot; said first support means is attached to said third support means; and said second support means is attached to said fourth support means beside the attachment of said first and third support means.

20. According to claim 17
a cover for said instrument attached to said first support means and extending over at least a part of said second support means.

21. According to claim 17,
said marking means is pivotally supported to said first support means through a flex pivot.

22. According to claim 21,
said flex pivot members are balanced about the center of said flex pivot assembly.

* * * * *